3,276,970
PROCESS FOR THE PRODUCTION OF β-CAROTENE

Leon Ninet and Jacques Albert Renaut, Paris, and Robert Charles Francois Tissier, Maisons-Alfort, France, assignors to Rhone-Poulenc S.A., Paris, France, a corporation of France
No Drawing. Filed July 20, 1964, Ser. No. 383,984
Claims priority, application France, Sept. 23, 1963, 948,640
14 Claims. (Cl. 195—28)

The present invention relates to the production of β-carotene by fermentation.

β-Carotene can be obtained by the submerged fermentation of microorganisms of the Choanephora or Blakeslea type. A variety of conditions favour the production of β-carotene. Barnett et al. [Science, 123, 141 (1956)] showed that the production of β-carotene is improved by the simultaneous culture of opposite (+ and −) forms of one species. The culture of opposite forms of different species also leads to an improved yield [C. Hesseltine, Mycologia, 49, 449 (1957)]. It has also been found that the addition to the nutrient medium of whole or hydrolysed grain, vegetable oils, surface-active agents, antioxidants or thickening agents increases the yield of β-carotene [R. Anderson et al., J. Agr. Food Chem. 6, 543 (1958); A. Ciegler et al., App. Microb. 7, 94 and 98 (1959)]. Moreover, Mackinney et al. [J. Amer. Chem. Soc. 74, 3456 (1952)] have shown that the addition of β-ionone to the static culture of a Phycomyces greatly increases the formation of β-carotene, to the detriment of the formation of other carotenoid pigments. Anderson et al. (loc. cit.) noted the same effect in agitated cultures of Blakeslea and Choanephora.

It has now been found that it is advantageous to add 2,6,6-trimethyl-1-acetylcyclohexene to the nutrient medium. This compound acts as a precursor for β-carotene, but has the advantage over β-ionone, heretofore used for the same purpose, of being less complex and therefore more readily obtainable. According, therefore, to the present invention, a process for the production of β-carotene comprises culturing aerobically the + and − forms of *Blakeslea trispora* (NRRL 2456 and 2457) in a nutrient medium containing 2,6,6 - trimethyl - 1-acetylcyclohexene.

The addition of 2,6,6-trimethyl-1-acetylcyclohexene to the nutrient medium leads to a considerable increase in the β-carotene yield, and may be made instead of, or in addition to, an addition of β-ionone. When 2,6,6-trimethyl-1-acetylcyclohexene is used alone, it may be added to the culture medium in an amount from 0.1 to 10 g. per litre, at the beginning of or during the course of the fermentation, in one or more lots. When 2,6,6-trimethyl-1-acetylcyclohexene is employed in association with β-ionone, the quantity of the former is then ordinarily 0.1 to 6 g. per litre, and of the latter 0.1 to 4 g. per litre. Preferably, there is employed either between 0.5 and 2 g. per litre of 2,6,6-trimethyl-1-acetylcyclohexene alone, or a mixture such that the medium contains 0.3 to 1.5 g. per litre of 2,6,6-trimethyl-1-acetylcyclohexene and 0.2 to 1 g. per litre of β-ionone, the addition being made 1 to 3 days after the beginning of the culture. Regardless, however, of the quantity of these compounds added, and of the moment of the addition, it is desirable to continue the culture for 6 to 10 days after the inoculation in order to obtain the maximum yield of β-carotene.

The culture medium may vary, but essentially it contains assimilable sources of carbon and nitrogen, mineral elements and, optionally, growth factors, anti-oxidants, surface-active agents, thickening agents and other precursors.

As assimilable carbon source, there may be used carbohydrates such as glucose, dextrins, starch, or animal or vegetable oils such as lard or soya bean oil or cottonseed oil. The assimilable nitrogen source may be pure chemical substances or complex substances containing mainly nitrogen in protein form, e.g. casein, lactalbumin, and gluten and their hydrolysates, soya bean flour, peanut flour, yeast extracts, distillers solubles and cornsteep liquor.

Some of the mineral elements added, such as the alkali metal or alkaline-earth metal phosphates, may have a buffering or neutralising effect.

The most frequently employed and most valuable of the growth factors is vitamin $B_1$ or thiamine. As antioxidants, there may especially be mentioned N,N′-diphenylparaphenylenediamine, more 2,2,4-trimethyl-6-ethoxy-1,2-dihydroquinoline, ascorbic acid and sorbic acid, the two first being preferred. The surface-active agents are preferably of the non-ionic type, such as derivatices of sorbitol with fatty acids, or products based upon ethylene oxide condensates. Among the most commonly employed thickening agents are starch, carboxymethylcellulose and agar.

It is also preferred that the nutrient medium contains one or more of the activators disclosed in our application Serial No. 285,574, filed on June 5, 1963, now Patent No. 3,235,467. Such an activator is either dimethylformamide, acetamide, dimethylacetamide, propionamide, butyramide, succinimide, N-bromosuccinimide, N-hydroxymethylsuccinimide, caprolactam, α-pyrrolidone, or dimethylsulphoxide. The preferred activators are α-pyrrolidone and succinimide.

The following examples show how the invention may be put into practice.

Example I

Culture medium A is prepared as follows. 500 cc. of water containing 60 g. of distillers solubles are boiled for 15 minutes. After cooling, there are added:

| | | |
|---|---|---|
| Starch | g | 60 |
| Soya bean oil | cc | 35 |
| Cottonseed oil | cc | 35 |
| Tween 80 | g | 5 |
| Yeast extract | g | 1 |
| Monopotassium phosphate | g | 0.5 |
| Manganese sulphate, monohydrate | g | 0.1 |
| Thiamine hydrochloride | g | 0.01 |

The volume is made up to 1000 cc. with distilled water. The mixture is adjusted to a pH value of 6.3 with a few drops of 10 N sodium hydroxide, distributed in 300-cc. Erlenmeyer flasks in a proportion of 50 cc. per flask, and then sterilised for 20 minutes at 120 °C. After sterilisation and cooling 0.5 cc. of a sterile 1% solution of 2,2,4-trimethyl-6-ethoxy-1,2-dihydroquinoline in petroleum is added to each flask under sterile conditions.

Each flask is then inoculated with 5 cc. of an agitated culture containing the + and − forms of *Blakeslea trispora* (NRRL 2456 and NRRL 2457) and aged for 48 hours. The flasks are then placed on a rotative shaker table turning at 220 r.p.m. in a thermostat at 26° C. After incubation for 2 days, the flasks are divided into two groups and they receive the following additions under sterile conditions:

1st group: petroleum 0.5 cc.
2nd group: 50 mg. of 2,6,6-trimethyl-1-acetylcyclohexene (TMACH) in solution in 0.5 cc. of petroleum.

The cultures are then continued under the same temperature and stirring conditions for 8 more days. At the end of this time, the production of β-carotene is maximum in all the flasks.

The determination of the β-carotene is carried out as follows: The mycelium is separated by filtration, washed with water and then dried for one night at 35° C. in vacuo. The dry mycelium is then extracted with hexane. The β-carotene is separated from the other carotenoids present by chromatography of the extract on alumina. The elution fractions containing β-carotene are combined and spectro-photometrically determined in relation to a pure specimen of β-carotene. The following results are obtained:

Mg./l. of β-carotene
1st group, without precursor _____ 825
2nd group, with TMACH _____ 1265

*Example II*

A culture medium B is prepared in the same manner as medium A in Example I, but 200 mg. of 2-pyrrolidone are added under sterile conditions to each flask, after sterilisation and cooling, in addition to the antioxidant in solution in petroluem. The flasks are then inoculated and incubated under the conditions described in Example I. After incubation for 2 days, the flasks are divided into two groups and they receive the following additions under sterile conditions:

1st group: petroleum, 0.5 cc.
2nd group: 50 mg. of 2,6,6-trimethyl-1-acetlycyclohexene (TMACH) in solution in 0.5 cc. of petroleum.

After these additions, the cultures are continued for 8 more days under the same temperature and stirring conditions.

The β-carotene content is determined as in Example I, and the following results are obtained:

Mg./l. of β-carotene
1st group, without precursor _____ 1360
2nd group, with TMACH _____ 1820

*Example III*

A culture medium C is prepared in the same manner as medium A in Example I, adding 4 g./l. of succinimide as well as the starch, oils and other constituents. After distribution in Erlenmeyer flasks and sterilisation, the medium is similarly completed by a sterile addition to each flask of antioxidant in solution in petroleum. The flasks are thereafter inoculated and incubated under the conditions described in Example I. After incubation for 2 days, the flasks are divided into two groups and they receive the following additions under sterile conditions:

1st group: petroleum, 0.5 cc.
2nd group: 50 mg. of 2,6,6-trimethyl-1-acetylcyclohexene (TMACH) in solution in 0.5 cc. of petroleum.

After these additions, the cultures are continued for 8 days under the same temperature and stirring conditions.

The β-carotene contents are determined as in Example I, and the following results are obtained:

Mg./l. of β-carotene
1st group, without precursor _____ 1240
2nd group, with TMACH _____ 1690

*Example IV*

Medium C, including the antioxidant in petroleum, is prepared as in Example III and the flasks containing the medium are inoculated and incubated under the conditions described in Example I. After incubation for 2 days, the flasks are divided into seven groups and each flask receives the following additions under sterile conditions:

1st group: 50 mg. of TMACH in solution in 0.5 cc. of petroleum.
2nd group: 50 mg. of TMACH and 10 mg. of β-ionone in solution in 0.5 cc. of petroleum.
3rd group: 50 mg. of TMACH and 20 mg. of β-ionone in solution in 0.5 cc. of petroleum.
4th group: 50 mg. of TMACH and 30 mg. of β-ionone in solution in 0.5 cc. petroleum.
5th group: 50 mg. of TMACH and 40 mg. of β-ionone in solution in 0.5 cc. of petroleum.
6th group: 50 mg. of TMACH and 50 mg. of β-ionone in solution in 0.5 cc. of petroleum.
7th group: 50 mg. of β-ionone in solution in 0.5 cc. of petroluem.

After these additions, the cultures are continued for 8 more days under the same temperature and stirring conditions.

The β-carotene contents are determined as indicated in Example I, and the following productions are obtained:

| No. of group | Precursor in g./l. | | β-Carotene in mg./l. |
|---|---|---|---|
| | TMACH | β-Ionone | |
| 1 | 1 | 0 | 1,780 |
| 2 | 1 | 0.2 | 1,925 |
| 3 | 1 | 0.4 | 2,010 |
| 4 | 1 | 0.6 | 2,185 |
| 5 | 1 | 0.8 | 2,205 |
| 6 | 1 | 1 | 2,265 |
| 7 | 0 | 1 | 2,065 |

*Example V*

Into a stainless steel 30-litre fermentation vessel are introduced:

Distillers solubles _____g__ 1,275
Water _____litres__ 11

The mixture is stirred and heated at 95° C. for 10 minutes. After cooling, the pH is adjusted to 6.45 with 58 cc. of 10 N sodium hydroxide and the medium is completed with the following materials:

Starch _____g__ 750
Soya bean oil _____cc__ 450
Cottonseed oil _____cc__ 450
Yeast extract _____g__ 15
Monopotassium phosphate _____g__ 7.5
Manganese sulphate, monohydrate _____g__ 1.5
2,2,4-trimethyl-6-ethoxy-1,2-dihydroquinoline in 50% solution in ethanol _____cc__ 3
Aqueous thiamine hydrochloride solution (0.3 g./l.) _____cc__ 250

The volume is adjusted to 15 litres with water. The pH of the mixture is 6.45. The medium is sterilised for 50 minutes at 122° C. by steam injection. After cooling, the pH is 5.95 and the volume 14.5 litres. A solution of 45 g. of succinimide in 350 cc. of water, and then 150 cc. of petroleum filtered under sterile conditions are added under sterile conditions. The fermentation vessel is then inoculated with 1500 cc. of an inoculum culture of the + and — forms of *Blakeslea trispora*, aged for 49 hours. The culture is carried out at 26° C. with agitation with a turbine rotating at 400 r.p.m. and with aeration with sterile air supplied at 1.2 cubic metres per hour.

After 40 hours of culture, 150 cc. of petroleum are added under sterile conditions, and a device is set in operation which adds continuously to the culture, between the 2nd and 6th days of the fermentation, 1000 cc. of sterile aqueous solution containing 450 g. of glucose monohydrate. The same aeration, agitation and temperature conditions are maintained for the 5 days during which the culture is continued.

In two other 30-litre fermentation vessels, the above-described medium is prepared in the same way and completed with the same additions. The medium is inoculated with the same inoculum culture and the culture is carried out throughout the duration of the fermentation (7 days) under the above-described aeration, agitation and temperature conditions. After 40 hours of culture, there are set in operation in the two apparatus the devices for the continuous addition of glucose monohydrate under the above-described conditions of concentration and duration. At the same time, there are added under sterile conditions to the second fermentation vessel: 15 g. of 2,6,6-trimethyl-1-acetylcyclohexene (TMACH) in sterile solution in 150 cc. of petroleum (i.e. 1 g./l.); and to the third fermentation vessel: 22.5 g. of 2,6,6-trimethyl-1-acetylcyclohexene in sterile solution in 150 cc. of petroleum (i.e. 1.5 g./l.).

The determination of β-carotene produced in these three fermentation vessels is carried out as in Example I. The following results are obtained:

|  | Mg./l. of β-carotene |
|---|---|
| Operation without percursor | 770 |
| Operation with addition of TMACH (1 g./l.) | 1280 |
| Operation with addition of TMACH (1.5 g./l.) | 1445 |

We claim:

1. Process for the production of β-carotene which comprises culturing aerobically the + and − forms of *Blakeslea trispora*, NRRL 2456 and 2457, in a nutrient medium containing 0.1 to 10 g. per litre of 2,6,6-trimethyl-1-acetylcyclohexene and recovering β-carotene from the said medium.

2. Process for the production of β-carotene which comprises culturing aerobically the + and − forms of *Blakeslea trispora*, NRRL 2456 and 2457, in a nutrient medium containing 0.1 to 6 g. per litre of 2,6,6-trimethyl-1-acetylcyclohexene and 0.1 to 4 g. per litre of β-ionone and recovering β-carotene from the said medium.

3. Process according to claim 1 in which the nutrient medium contains 0.5 to 2.0 g. per litre of 2,6,6-trimethyl-1-acetylcyclohexene.

4. Process according to claim 2 in which the nutrient medium contains 0.3 to 1.5 g. per litre of 2,6,6-trimethyl-1-acetylcyclohexene and 0.2 to 1 g. per litre of β-ionone.

5. Process according to claim 3 in which the addition of the 2,6,6-trimethyl-1-acetylcyclohexene is made 1 to 3 days after the beginning of the culture.

6. Process according to claim 4 in which the addition of the 2,6,6-trimethyl-1-acetylcyclohexene and β-ionone is made 1 to 3 days after the beginning of the culture.

7. Process according to claim 1 in which the nutrient medium also contains thiamine.

8. Process according to claim 2 in which the nutrient medium also contains thiamine.

9. Process according to claim 1 in which the nutrient medium also contains an antioxidant selected from the group consisting of 2,2,4-trimethyl-6-ethoxy-1,2-dihydroquinoline and N,N'-diphenyl-p-phenylene diamine.

10. Process according to claim 2 in which the nutrient medium also contains an antioxidant selected from the group consisting of 2,2,4-trimethyl-6-ethoxy-1,2-dihydroquinoline and N,N'-diphenyl-p-phenylene diamine.

11. Process according to claim 1 in which the nutrient medium contains an activator selected from the group consisting of dimethylformamide, acetamide, dimethylacetamide, propionamide, butyramide, succinimide, N-bromosuccinimide, N-hydroxymethylsuccinimide, caprolactam, α-pyrrolidone, and dimethylsulphoxide, the said activator being present in said nutrient medium in amount from 0.1 to 10 g. per litre.

12. Process according to claim 1 in which the nutrient medium contains an activator selected from the group consisting of α-pyrrolidone and succinimide in amount from 0.5 to 6 g. per litre of said nutrient medium.

13. Process for the production of β-carotene which comprises culturing aerobically the + and − forms of *Blakeslea trispora*, NRRL 2456 and 2457, in a nutrient medium containing assimilable sources of carbon and nitrogen, thiamine, an antioxidant selected from the group consisting of 2,2,4-trimethyl-6-ethoxy-1,2-dihydroquinoline and N,N'-diphenyl-p-phenylene diamine, an activator selected from the group consisting of α-pyrrolidone and succinimide in amount from 0.5 to 6.0 g. per litre of nutrient medium, and 0.5 to 2.0 g. per litre of nutrient medium of 2,6,6-trimethyl-1-acetylcyclohexene, the last named compound being added 1 to 3 days after the beginning of the culture, and the culture being continued for a total of 6 to 10 days and recovering β-carotene from the said medium when the culture is complete.

14. Process for the production of β-carotene which comprises culturing aerobically the + and − forms of *Blakeslea trispora*, NRRL 2456 and 2457, in a nutrient medium containing assimilable sources of carbon and nitrogen, thiamine, an antioxidant selected from the group consisting of 2,2,4-trimethyl-6-ethoxy-1,2-dihydroquinoline and N,N'-diphenyl-p-phenylene diamine, an activator selected from the group consisting of α-pyrrolidone and succinimide in amount from 0.5 to 6.0 g. per litre of nutrient medium and 0.3 to 1.5 g. per litre of nutrient medium of 2,6,6-trimethyl-1-acetyl-cyclohexene and 0.2 to 1.0 g. per litre of said medium of β-ionone, the two last named compounds being added 1 to 3 days after the beginning of the culture, and the culture being continued for a total of 6 to 10 days and recovering β-carotene from the said medium when the culture is complete.

No references cited.

A. LOUIS MONACELL, *Primary Examiner.*

ALVIN E. TANENHOLTZ, *Examiner.*